United States Patent
Balgård

[19]

[11] Patent Number: 5,525,976
[45] Date of Patent: Jun. 11, 1996

[54] TEMPERATURE MEASURING SYSTEM

[75] Inventor: Lennart Balgård, Arboga, Sweden

[73] Assignee: Asea Brown Boveri AB, Vasteras, Sweden

[21] Appl. No.: 90,105

[22] PCT Filed: Feb. 21, 1992

[86] PCT No.: PCT/SE92/00104

§ 371 Date: Jul. 20, 1993

§ 102(e) Date: Jul. 20, 1993

[87] PCT Pub. No.: WO92/14999

PCT Pub. Date: Sep. 3, 1992

[30] Foreign Application Priority Data

Feb. 25, 1991 [SE] Sweden ............................ 9100534

[51] Int. Cl.⁶ .................................................. G08C 19/16
[52] U.S. Cl. .................. 340/870.17; 340/870.18; 340/870.19; 340/825.64
[58] Field of Search .................. 340/870.17, 870.18, 340/870.19, 870.20, 870.29, 825.64; 359/146, 143, 158

[56] References Cited

U.S. PATENT DOCUMENTS

| | | | |
|---|---|---|---|
| 3,630,079 | 12/1971 | Hughes et al. | 340/73 |
| 3,651,405 | 3/1972 | Whitney et al. | 340/870.18 |
| 3,748,655 | 7/1973 | Engelhardt et al. | |
| 3,815,093 | 6/1974 | Caretto et al. | 340/870.18 |
| 3,872,455 | 3/1975 | Fuller et al. | 340/870.18 |
| 4,471,354 | 9/1984 | Smith | 340/870.17 |
| 4,799,005 | 1/1989 | Fernandes et al. | 340/870.17 |
| 4,848,923 | 7/1989 | Ziegler et al. | 340/870.17 |
| 4,855,671 | 8/1989 | Fernandes | 340/870.17 |
| 4,870,425 | 9/1989 | Gunny | 340/825.64 |
| 4,886,980 | 12/1989 | Fernandes et al. | 340/870.17 |
| 4,916,643 | 4/1990 | Ziegler et al. | 340/870.17 |
| 5,128,792 | 7/1992 | Teich et al. | 359/158 |
| 5,150,114 | 9/1992 | Johansson | 340/825.54 |
| 5,216,532 | 6/1993 | Taylor | 359/143 |
| 5,257,863 | 11/1993 | Chu et al. | 340/870.17 |
| 5,331,450 | 7/1994 | Heep et al. | 359/146 |

FOREIGN PATENT DOCUMENTS

| | | |
|---|---|---|
| 0256207 | 2/1988 | European Pat. Off. |
| 0376039 | 7/1990 | European Pat. Off. |
| 1904853 | 9/1969 | Germany. |
| 2546694 | 4/1976 | Germany. |
| 2918069 | 11/1980 | Germany. |
| WO83/0841 | 8/1983 | WIPO. |

*Primary Examiner*—Edward L. Coles, Sr.
*Assistant Examiner*—Thomas L. Stoll
*Attorney, Agent, or Firm*—Watson Cole Stevens Davis

[57] ABSTRACT

For temperature measurement at a number of measuring points on, for example, current-carrying bars (2) in a high-voltage switchgear, a data transmitter (1) is used which is arranged near each measuring point and at the same potential as such point. The transmitter is controlled by a temperature sensor (8) and comprises components (3, 4) for capturing drive energy from the electric or the magnetic field around the bar. The temperature sensor (8) may consist of a quartz crystal, the resonance frequency of which has a specified temperature dependence. Measured data is transmitted by means of light (e.g. infrared) in the air to a data receiver (10) at ground potential. The data receiver (10) is able to receive measured data from a plurality of data transmitters.

6 Claims, 1 Drawing Sheet

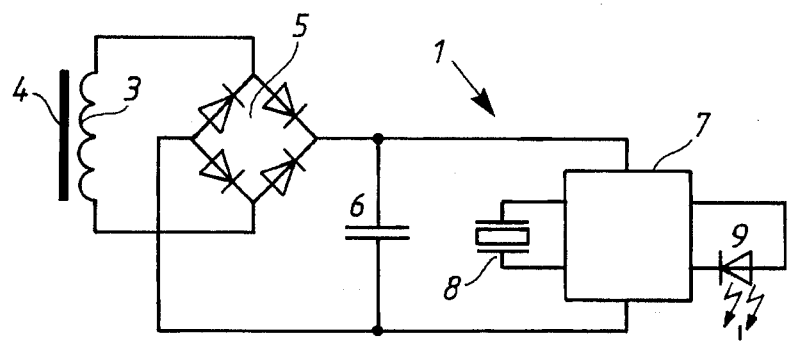
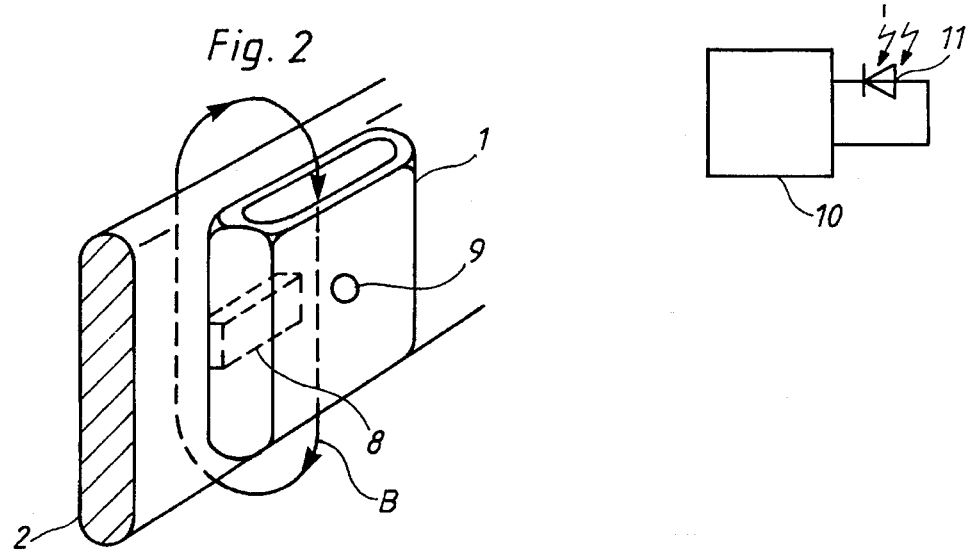
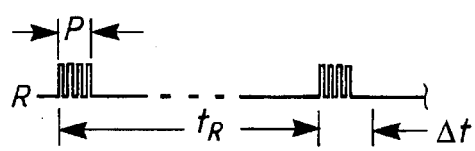
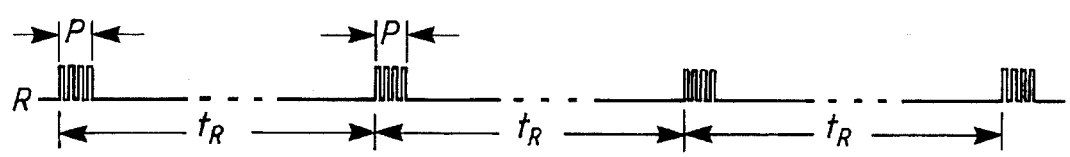
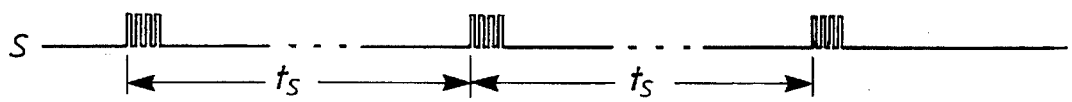
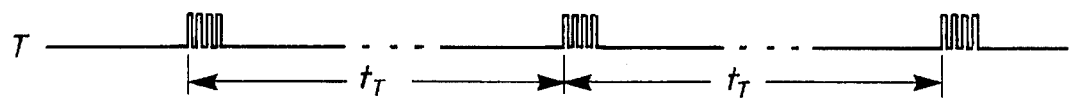

TEMPERATURE MEASURING SYSTEM

TECHNICAL FIELD

The present invention relates to a device for measurement of temperature on current conductors at high potential which is defined in more detail in the preamble to claim 1. By high potential are meant here voltage levels from 220 V up to the highest system voltages occurring in power transmission systems.

BACKGROUND ART

Within the electric power technique it is of great interest to know the temperature of current carrying apparatus and busbars. This can be used for controlling the magnitude of the load (e.g. in case of temporary overload) and for monitoring undesired power development in busbar joints, contacts and cable connections, whereby, for example, increased resistances caused by corrosion may be detected.

What makes the above measuring problem especially difficult is that the measuring points are positioned at high potential in connection with large current. The measuring system must handle high electric and magnetic fields and must not increase the risk of creeping currents or flashover. Preferably, it should be designed such that no new type tests need to be made to verify the safety.

In the publication Siemens-Energietechnik 6 (1984) No. 6, pp. 277–279, Jez et al: "Lichtleiter-Trennverstärker, ein Gerät zum Messen auf hohem Potential", a measuring device intended, inter alia, for temperature measurement in high-voltage plants is described. A considerable drawback in this device is that the current supply to the measured data transmitter takes place with the aid of an accumulator placed at high potential near the transmitter, which results in the high-voltage part of the equipment becoming bulky and maintenance-demanding. As temperature sensors in this equipment there are used thermocouples, which results in a weak analogue signal which requires amplification and conversion. For transmission of measured information from the transmitter at high potential to the receiver at ground potential, a light guide with optical fibres is used. This may in certain cases entail an increased risk of creeping currents and flashover.

The above-mentioned drawbacks can only be partly avoided by a device for temperature measurement described in patent specification EP-A-0263233. This device comprises a temperature sensor in the form of a quartz crystal. The crystal constitutes the frequency-determining element in an oscillator circuit, the output signal of which is converted into a sequence of pulses which are sent out as light to a detector. The temperature of the sensor is obtained by measuring the period of the received signal. The current supply of the sensor unit is performed, also in this device, with the aid of a battery or from an evaluation unit via a cable. Such a solution is therefore hardly applicable to temperature measurements at high potential. In addition, the device is relatively sensitive to disturbances from ambient light, since each period of the signal on which the measurement is based contains only one pulse. The evaluation unit of the device is intended to receive data from only one transmitter, which means that in the case of applications where temperature measurements are to be carried out at a plurality of measuring points, measuring equipment designed in this way will become relatively costly.

From patent specification DE-B-1904853 it is also known to use, in connection with temperature measurement in oil-filled transformers, a quartz crystal serving as a temperature sensor for control of an oscillator. The transmission of measured information to ground potential is in this case performed with the aid of ultrasonics. Neither in this device is it possible for one and the same receiver to receive and distinguish measured data from several transmitters.

SUMMARY OF THE INVENTION

The present invention aims to provide a relatively simple and practically maintenance free temperature measurement device for the above-mentioned purposes, which does not suffer from the above-mentioned disadvantages of prior art designs. The device is to be so small in volume that it may be used, for example, in existing cubicle-enclosed medium voltage switchgear. This is obtained according to the invention by a device with the characteristic features described in the appended claims.

A measuring device according to the invention may comprise a plurality of small electronics units which are placed at the measuring points so that they are at the same potential as the measuring points from an electrical point of view. The units are adapted to obtain their required drive energy from the magnetic field at the measuring point, measure the temperature, convert measured data into a message and transmit this through the air to a receiver which is positioned at ground potential. The message is built up such that a receiver can receive measured data from several transmitters.

A transmitter of measured data according to the invention is adapted to transmit, at the same time, both a digital identity code of its own and analog measured information to the data receiver by modulating the output signal of a transmitter element in such a way that this output signal is in the form of short pulse showers which are repeated with a relatively long period, which is determined both by the identity code of the data transmitter and by the measured value. The measured value is thereby represented by a stepless deviation from a basic period which is selected for each data transmitter and which, in turn, represents the identity code of the respective data transmitter. By transmitting the measured information in the form of pulse showers, more reliable and sensitive receivers can be constructed than if the information would have consisted only of one pulse per period. The reason for this is that the receiver can be allowed to be selective for the frequency occurring in the pulse shower, thus sorting out unwarranted signals, for example from ambient light.

The proposed solution to allow the transmitters to transmit over their own identity code, such that the same receiver can receive and distinguish data from several transmitters, is advantageous in that it requires hardly any extra hardware in the transmitter unit compared with a system without transmitter identification. In an application where the number of sensor units is large, it is important to keep the degree of complexity in the sensor unit at a low level, and rather spend a little more on the receiver.

In a particularly suitable embodiment of the invention, the above-mentioned electronics unit comprises an oscillator circuit, the frequency of which is changed with the temperature. As temperature sensor there is used directly a crystal (quartz resonator), the resonance frequency of which has a specified temperature dependence.

BRIEF DESCRIPTION OF THE DRAWING

The invention will be explained in greater detail by describing an embodiment with reference to the accompanying drawing, wherein FIG. 1 is a diagram showing the principle of a measuring device according to the invention, FIG. 2 schematically shows a transmitter of measured data attached to a current-carrying bar, and FIG. 3 shows examples of pulse trains emitted from three transmitters which are placed on different phase conductors in a three-phase system.

DESCRIPTION OF THE PREFERRED EMBODIMENT

The data transmitter shown in FIG. 2 is fixed, for example by a binding strap, to a current-carrying bar 2 in, for example, a switchgear cubicle for medium voltage. (By medium volt, age is meant here the voltage range 1–40 kV.) The transmitter 1 has a size of, for example, 10×40×40 mm and is designed with rounded corners for avoiding electric field concentrations. The transmitter is provided with an energy supply unit comprising a coil 3 with an iron core 4 (FIG. 1). The magnetic field B generated by the current in the bar 2 induces in the coil 3 a voltage which is rectified in a rectifier 5. Energy is stored in a capacitor 6 to continuously drive an electronics unit 7, and to transmit messages. The current in the bar 2 may vary from, for example, 50 A (operating current) to 40 kA (short-circuit current), which entails great variations in the induced voltage in the coil 3. However, because of the iron core 4, which becomes saturated at the higher currents, a certain stability of the energy from the coil is obtained. At too low magnetic fields (=low currents), the temperature measurement function is allowed to cease.

As temperature sensor there is used a quartz crystal 8, the resonance frequency of which has a specified temperature dependence. A suitable crystal for this purpose is made by the Swiss firm Micro Crystal, CH-2540 Grenchen. This crystal has a resonance frequency of 262144 Hz at 25° C., and the frequency variation is linear with about 7 Hz/1° C. The crystal 8 is part of a so-called Pierce oscillator in the electronics unit 7. The oscillator signal from the temperature measurement is frequency-divided in several stages, and is used to create a pulse train consisting of showers of pulses (e.g. 16 cycles) with a suitable frequency (e.g. 33 kHz) which are transmitted at intervals which may be selected in the transmitter (e.g. 1 shower/8–16 s, which is selected either at the production or the commissioning stage). To enable a receiver, which receives measured data from several different transmitters, to identify the different pulse trains, different lengths of the intervals between the showers in the different transmitters may be selected, as is clear from FIG. 3. The intervals $t_R$, $t_S$ and $t_T$ between the pulse showers P in the different phases R, S, T may, for example, be $t_R$=8 s, $t_S$=9 s and $t_T$=10 s. Because the intervals have different lengths, the advantage is also obtained that pulse showers from different transmitters more seldom hit the receiver at the same time.

When the temperature of, for example, the bar 2 in phase varies, the intervals between the pulse showers from the data transmitter of the bar will be changed by an amount $\Delta t$ from the value $t_R$ exactly set at a certain temperature. This change $\Delta t$ may amount to a few milliseconds and constitutes a measure of the temperature change.

The pulse train resulting from the measured data conversion controls a light emitting diode (LED) 9 which emits light (visible or infrared). To obtain a greater degree of scattering of the emitted light, two transmitter diodes may be used, which are directed in different directions.

The transmission of measured information to ground potential takes place through the air, that is, without the use of light guides. The information is captured by a data receiver 10 which comprises a photodetector 11, which converts the light signal into an electric signal which is processed for presentation in a suitable way.

Transmitting measured information in the form of short pulse showers with relatively long intervals has the advantage, compared with a transmission with a continuous pulse train, that one and the same receiver can receive and distinguish measured data from several different transmitters. In addition, the energy requirement is reduced, and the service life of the LED increases.

The transmission distance between the transmitter and the receiver may vary between about 0.1 m in medium voltage switchgear and about 8 m in an 800 kV switchgear.

The invention is not limited to the embodiment shown and described but several modifications are possible within the scope of the claims. For example, instead of transmitting measured data by light, it is possible to use ultrasonics for the transmission. The proposed device is also suitable for temperature measurements in oil-filled transformers, the measured information then being transmitted through the transformer oil.

I claim:

1. An apparatus for measuring temperature at a plurality of measuring points on conductors operative at a high potential to carry electrical current and to produce an electric and magnetic field when operative comprising:

temperature sensing means at each measuring point for sensing the temperature of the conductor and producing a data signal for each said measuring point;

transmitting means responsively associated with each measuring point and responsive to the data signal being located proximate thereto and at substantially the same potential thereof for producing a corresponding output signal being modulated to indicate uniquely the identity of said measuring point and to indicate the temperature for each such measuring point;

each of said transmitting means operative when energized for modulating its corresponding output signal so that such output signal is in the form of pulse bursts repeated with a selected basic period of time duration different than each of other basic periods so that each such basic period corresponds uniquely to the associated measuring point, said time duration of each basic period representing each measuring point and being variable up to a maximum deviation, said basic period being long relative to the duration of said pulse bursts, and said deviation of the output signal from the basic period representing the temperature of the measuring point and the time differences between the basic periods being relatively larger than said maximum deviation of said period; and an energy unit responsive to at least one of the electric and magnetic field produced by the conductors for obtaining energy therefrom and operatively coupled to the temperature sensing means and the transmitter means for energizing the same.

2. The device according to claim 1 further comprising a receiver at ground potential for receiving the output signal.

3. The device according to claim 2 wherein the transmission of the output signal between the transmitter and the receiver takes place in at least one of air, a gaseous medium and a liquid medium.

4. The device according to claim 1 wherein the temperature sensor comprises a quartz crystal and an oscillator circuit coupled thereto, said quartz crystal having a resonance frequency with a specified temperature dependence.

5. The device according to claim 1 wherein the transmitting means comprises a converter of the data signal and including a light emitting diode responsive to the output signal for emitting modulated light in the infrared region.

6. The device according to claim 1 wherein the transmitter means comprises an ultrasonic transmitter.

* * * * *